United States Patent Office 3,235,548
Patented Feb. 15, 1966

3,235,548
IMIDAZOLINE COMPOUNDS AND METHOD
OF PREPARATION
Isidore Pollack, Westminster, and Frederick S. Kaveggia, Los Angeles, Calif., assignors to Purex Corporation, Ltd., Lakewood, Calif., a corporation of California
No Drawing. Filed July 3, 1962, Ser. No. 207,415
8 Claims. (Cl. 260—240.1)

This invention relates to a novel group of compounds, and is particularly concerned with a novel group of compounds containing the imidazolie ring, many of which have fluorescent properties, and to a method of preparation of these compounds.

Fluorescent dyes and chemicals are now widely used in many arts. Thus, for example, fluorescent dyes are employed as textile dyes and are also used in inks, paints, pigments, dye penetrants for inspection of the surface of objects to detect cracks and flaws therein, and for coloring of metals. For some applications, the fluorescent dyes are required to be water soluble, while for others the dyes must be substantially insoluble in water and soluble in organic solvents. The most valuable types of fluorescent dyes are those which exhibit a bright fluorescence within the visible spectrum when excited by light of the proper wave length, e.g., ultraviolet or so-called "black light."

It is accordingly an object of the invention to provide a novel class of compounds, many of which possess fluorescent characteristics.

A particular object of the invention is the provision of a group of novel compounds characterized by the presence therein of an imidazoline ring, and exhibiting bright fluorescence.

Still another object is to afford novel, essentially water soluble, fluorescent dyes having a bright yellow to blue fluorescent emission within the visible spectrum.

Yet another object is the provision of procedure for producing the compounds of the invention.

Other objects and advantages will appear hereinafter.

We have unexpectedly found that, by reacting at high temperature a primary aliphatic amine containing a second primary amino group, e.g. an alkylene diamine containing two primary amino groups, with a tricarboxylated compound of the group consisting of citric acid, aconitic acid, tricarballylic acid, and esters thereof, a cyclization reaction occurs involving the carboxylic acid groups or the ester groups of the tricarboxylated compound, with both primary amino groups of the diamine, to form an imidazoline type radical, which replaces one or more of the carboxylic groups of the tricarboxylated compound. Water, or both water and an alcohol, are split off in the reaction, depending on whether the free acid or the ester is employed as the tricarboxylated compound, and resulting in a novel and valuable class of generally water soluble compounds, certain of which particularly exhibit bright yellow to blue fluorescence when excited by ultraviolet light.

The compounds produced according to the invention are of the general type represented by the formula:

(I)
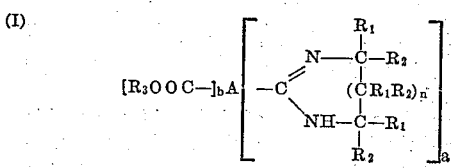

where A is a member of the group consisting of a decarboxylated citric acid radical, a decarboxylated aconitic acid radical, and a decarboxylated tricarballylic acid radical, $R_1$ and $R_2$ are each hydrogen, an alkyl radical, e.g., containing from 1 to about 22, preferably about 1 to about 12, carbon atoms, such as methyl, ethyl, propyl, isopropyl, butyl, amyly, octyl, nonyl, decyl, undecyl, duodecyl, and the like, and including cycloalkyl, e.g., cyclopentyl, cyclohexyl, and the like; an aryl radical, either monocyclic or polycyclic, such as phenyl, naphthyl, and the like; or alkaryl or aralkyl, such as methyl phenyl or ethyl phenyl, tolyl, phenyl ethyl, and the like; and wherein said alkyl, aryl, alkaryl and aralkyl substituents can be further substituted, e.g., by sulfonic acid groups, hydroxy groups, and the like, and wherein $R_1$ and $R_2$ may be the same or different; $R_3$ is hydrogen or an alkyl radical, e.g., methyl, ethyl, propyl, butyl, and the like; $n$ is an integer from 0 to 2, preferably 0; $a$ is an integer from 1 to 3, preferably 3; and $b$ is equal to 3—$a$.

In preferred practice all three carboxylic groups of the tricarboxylated compound, citric acid, aconitic acid, tricarballylic acid, or the esters thereof, are replaced by the imidazoline type rings, i.e. $a$ in Formula I is 3, and wherein $n$ is 0, so as to produce compounds of the general formula:

(II)
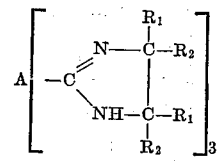

where A, $R_1$ and $R_2$ have the values above defined.

The most desirable compounds, according to the invention, are those having the general formula:

(III)
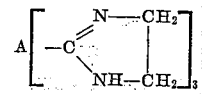

where A has the values above defined.

The preferred compounds of the invention, accordingly, are the tri-imidazoline substituted derivatives of citric acid, anonitic acid, and tricarballylic acid.

The following are some specific examples of novel compounds, according to the invention:

(a)
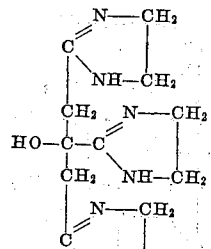

(b)
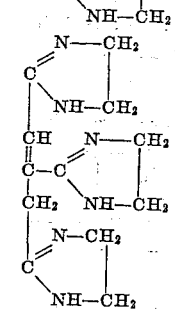

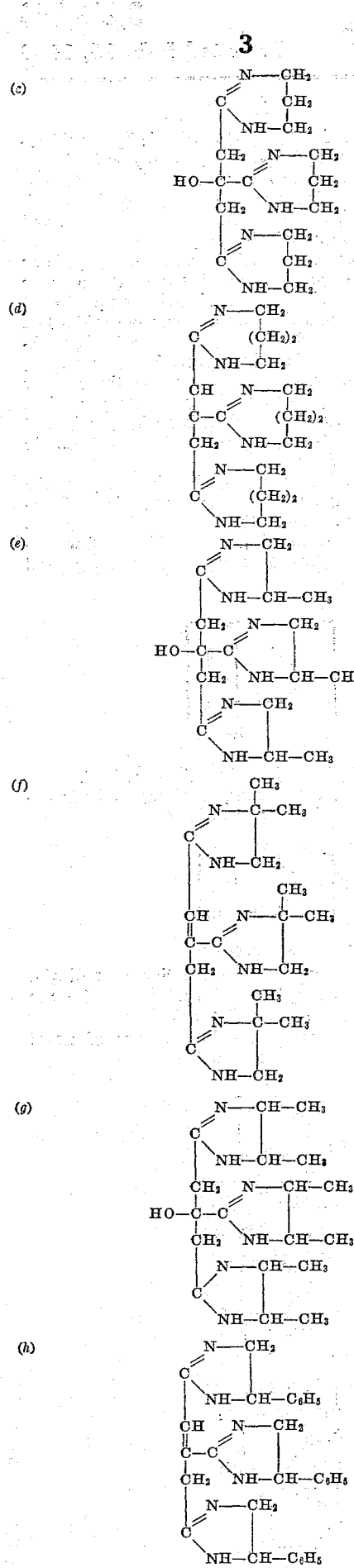
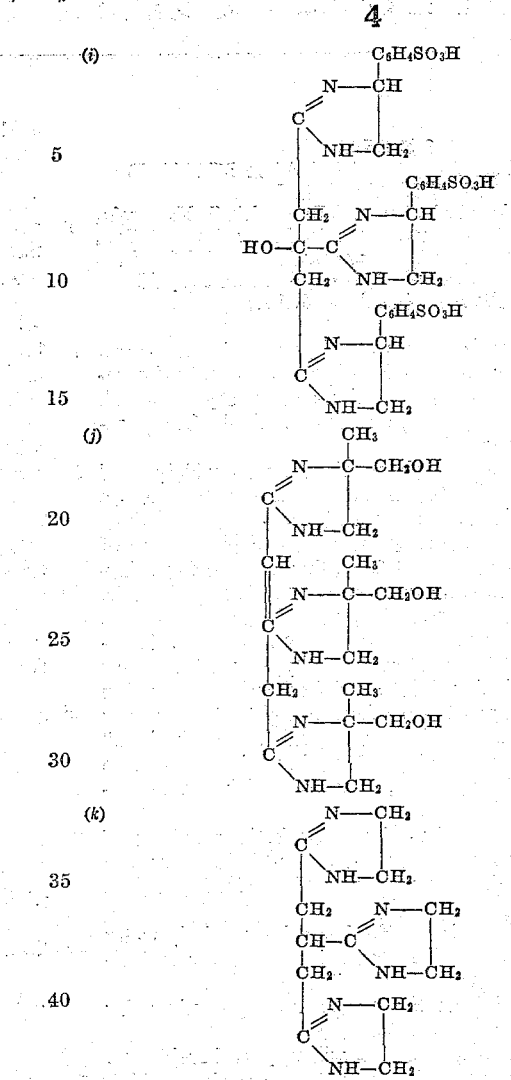

Aliphatic or alkylene diamines which can be reacted with the above tricarboxylated compound for producing the invention compounds have the general formula:

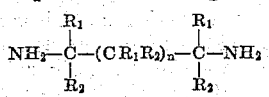

where $R_1$, $R_2$, and $n$ have the values above defined.

Examples of alkylene diamines which can be employed in the reaction with citric, aconitic or tricarballylic acid, or their esters, to produce the reaction products or novel compounds of the invention are ethylene diamine, propylene diamine, butylene diamine, methyl ethylene diamine, 1,1-dimethyl ethylene diamine, 1,2- dimethyl ethylene diamine, phenyl ethylene diamine, 1-(benzene p-sulfonic acid) ethylene diamine, 1-methyl 1-hydroxymethyl ethylene diamine, and 1,2-diphenyl ethylene diamine.

As the tricarboxylated reactant, the tricarboxylic acids, citric acid, aconitic acid, and tricarballylic acid, or their substituted derivatives, are suitable. Substituted citric, aconitic, or tricarballylic acids which can be employed are, for example, the alkyl, e.g., methyl, ethyl, propyl, and the like, derivatives, and the aryl, e.g., phenyl and naphthyl, derivatives of citric acid, aconitic acid, and tricarballylic acid.

The esters, e.g. the alkyl esters of citric acid, of aconitic acid or of tricarballylic acid, or their substituted derivatives, can also be employed. These are generally in the form of triesters, although mixed acid-esters may be employed such as the diesters of citric, aconitic, and tricarballylic acids. Thus, for example, triethyl citrate, triethyl aconitate, or triethyl carballylate can be employed, and diethyl citrate, diethyl aconitate and diethyl carballylate may also be suitable. The corresponding methyl, propyl and butyl esters can also be used. Substituted citric, aconitic or tricarballylic acid esters which may be employed include the alkyl, e.g., methyl, ethyl, propyl, and the like, derivatives, and the aryl, e.g., phenyl and naphthyl derivatives, of citric acid ester, aconitic acid ester, or tricarballylic acid ester.

The terms "a citric acid," "a citric acid esters," "an aconitic acid," "an aconitic acid esters," "a tricarballylic acid," and "a tricarballylic acid ester," as employed herein, are intended to denote either the unsubstituted or the substituted acids and esters. The preferred tricarboxylated compounds are the unsubstituted citric acid, aconitic acid, and tricarballylic acid, and their unsubstituted triesters.

The reaction between the amine and the tricarboxylated compound is carried out by forming a mixture of the amine and the acid or ester in the desired molar proportions, as described more fully below. The mixture is then stirred while low heat is applied over a period of, say, 15 to 20 minutes, to form a melt. When a completely homogeneous melt is obtained, the application of heat may be increased and the melt rapidly heated to temperature in the range of about 325° to about 400° F., usually about 350° to about 385° F., until frothing occurs. The reaction mixture is further heated and maintained at temperatures in the above ranges for a period, e.g., about 10 to 20 minutes, until frothing ceases, indicating completion of the reaction. Water, or both water and alcohol, are formed as a result of the cyclization or ring formation which takes place in the reaction.

When the reaction is completed, the reaction product is purified by extracting the reaction mixture, preferably with a suitable solvent for any unreacted or excess amine in the reaction mixture, and in which the reaction product is insoluble, e.g., isopropyl alcohol, and removing the solvent solution, containing the amine, e.g., by decantation from the reaction mixture. The residue containing water and residual organic solvent is then heated to evaporate water and remaining solvent, and the residue comprising reaction product is then dried.

As an alternative to the above purification procedure, a solvent can be used in which the reaction product is soluble and in which the unreacted or excess amine is insoluble, thus extracting a solvent solution of the product, and removing the solvent by distillation to recover the product.

Alterntively, the above-described solvent extractions can be omitted, and instead the reaction mixture can be subjected to vacuum distillation to drive off any amine, water, and alcohol, if present, followed by drying the reaction product residue.

The reaction products of the invention may be soluble in water in some instances and solvent soluble in other instances. Where, for example, an unsubstituted alkylene diamine is employed, or if substituted, and the substituents are short chain alkyl groups of up to about 3 carbon atoms, the products are generally water soluble. However, where a substituted diamine having one or more alkyl substituents containing about 4 or more carbon atoms, or having one or more aryl substituents, is employed, the resulting compound may be water insoluble but soluble in organic solvents such as alcohols or aromatic hydrocarbons.

Many of the invention compounds emit fluorescent light in the visible region of the spectrum when either the solid product or a solution thereof is subjected to an activating or exciting wave length of light, usually in the invisible portion of the spectrum, by irradiation with "black light" or ultraviolet light. The fluorescent emission of the products in solid form may be different than the fluorescent emission of the same product in solution, that is, a different color fluorescence may be obtained under these two conditions.

The compounds of the invention are produced employing a molar proportion of at least 1 mol of diamine per mol of the tricarboxylated compound. The preferred products, having the general Formulae II and III above, are prepared by employing in the condensation reaction about 3 mols of the diamine, e.g., ethylene diamine, per mol of either a citric acid, an aconitic acid, or a tricarballylic acid, or their respective esters. Molar proportions of diamine greater than 3 mols, e.g., 4 or 5, or more, mols per mol of a citric acid, an aconitic acid, or a tricarballylic acid compound, or their esters, can be employed to produce preferred compounds having the structure of Formulae II and III above, except that care must be taken to remove as much of the excess amine as possible from the reaction mixture, as the presence of such excess amine in the product may weaken the brightness of the fluorescent emission from the product.

Although preferred compounds can be prepared by reacting the diamine and a citric acid, an aconitic acid, or a tricarballylic acid, or their esters, in a molar proportion of about 3 mols of the diamine per mol of the acid or ester, as described above, useful compounds may be prepared employing a molar proportion of less than 3, e.g., from 1 to about 2.5 mols of diamine per mol of the acid ester. Employing the above less preferred lower molar proportions of diamine to tricarboxylated compound, products are formed according to Formula I above having a distribution of from 1 to 3 imidazoline type rings per mol of the products. That is, it is believed that a mixture of compounds may be formed, under such conditions, which contain individual compounds having, respectively, from 1 to 3 imidazoline type rings. These reaction products are also contemplated within the purview of the invention.

The fluorescent compounds or fluorescent dyes of the invention may be used to color cotton or nylon. Thus, for example, the compounds of the invention, e.g., Compound $h$ above, can be sulfonated, e.g., on the aromatic nucleus, or a sulfonated reaction product formed from a sulfonated aromatic reactant, such as a sulfonated aryl substituted diamine, e.g., Compound $i$ above. The provision of a sulfonated reaction product may render the dye substantive to cotton. In weakly acid baths, e.g., aqueous acetic or boric acid solutions, the fluorescent dyes of the invention are substantive to and can be exhausted on nylon and Acrilan.

Further, the fluorescent dyes of the invention can be employed in formulations useful for leak detection, in dye penetrants for detection of flaws in surfaces of bodies, in paints, e.g., water colors, and the like.

The following are examples of practice of the invention:

*Example 1*

96 grams (0.5 mol) of citric acid were added to 90 grams (1.5 mols) of ethylene diamine and well mixed. The mixture was heated slowly to 380° until frothing ceased. This product was purified by vacuum distillation, to remove any unreacted amine and water. The residue was dried, and the solid reaction product, Compound $a$ above, emitted a bright yellow-green fluorescence when excited by ultraviolet light. The compound dissolved in water and imparted a strong bluish-white fluorescence to its aqueous solution.

The structure of Compound $a$ is established by molecular weight determination and infrared and ultraviolet absorption data.

*Example 2*

17.4 grams of aconitic acid were reacted with 18.0 grams of ethylene diamine (1:3 mole ratio), by slow addition of the amine to the acid. This reaction was very vigorous and care was needed to avoid overheating and spattering which would cause loss of amine. After the vigorous reaction had subsided, the temperature was raised to about 350° F. for about 20 minutes. When frothing finally ceased, the reaction was considered completed. The product may be purified by suitable solvent extraction or vacuum distillation to remove excess amine. The reaction product, Compound *b* above, showed very strong fluorescence in the blue region of the spectrum, when a small amount (0.1% or less) is dissolved in water and excited under "black light."

*Example 3*

The procedure of Example 1 is repeated, employing in place of citric acid, 138 grams of triethyl citrate. Compound *a*, having the fluorescent properties noted in Example 1, is obtained.

*Example 4*

The procedure of Example 1 is repeated, employing in place of the ethylene diamine, 111 grams of methyl ethylene diamine. The Compound *e* above is obtained, having fluorescent properties similar to Compound *a* in Example 1.

*Example 5*

The procedure of Example 1 is repeated, employing in place of ethylene diamine, 324 grams of 1-(benzene p-sulfonic acid) ethylene diamine. Compound *i* above is obtained, having fluorescent properties similar to Compound *a* of Example 1, and having high solubility in water.

*Example 6*

The procedure of Example 1 is repeated, except employing only 45 grams of ethylene diamine (1.5 mols of ethylene diamine per mol of citric acid). A product is obtained having an average of less than 3 imidazoline rings per mol. Such product apparently has weaker fluorescent emission, both in solid form and in aqueous solution, in comparison to Compound *a* of Example 1.

*Example 7*

The procedure of Example 1 is repeated employing 0.5 mol of tricarballylic acid in place of the citric acid. A product having the structure of Compound *k* is thereby obtainable.

*Example 8*

The fluorescent dye of Formula *a* above is employed for coloring nylon by first forming a treating bath having the following composition:

| | Percent by weight |
|---|---|
| Nacconol NRSF (about 90% sodium alkylaryl sulfonate having an average of 12 carbon atoms in the alkyl chain and about 10% sodium sulfate) | 0.1 |
| Fluorescent dye—Compound *a* | 0.1 |
| Water | 99.8 |
| | 100.0 |

The pH of the bath is adjusted to 3.0 with formic acid, and nylon cloth is immersed in the bath maintained at about 140° F., for 10 minutes. It is then thoroughly rinsed and dried. The treatment imparts to it very strong blue fluorescence under black light.

From the foregoing, it is apparent that the invention provides a new class of compounds having valuable properties, particularly as fluorescent dyes, and to a process for preparing such compounds readily.

While we have described particular embodiments of our invention for purposes of illustration, it should be understood that various modifications and adaptations thereof may be made within the spirit of the invention, as set forth in the appended claims.

We claim:

1. A compound having the formula

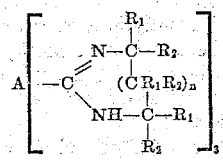

where A is a member selected from the group consisting of the citric, the aconitic and the tricarballylic acid radical, from which all three carboxyl groups have been removed, $R_1$ and $R_2$ are each a member selected from the group consisting of hydrogen, alkyl of from 1 to 22 carbon atoms, and aryl, and *n* is an integer of from 0 to 2

2. A compound having the formula

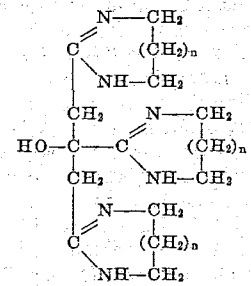

wherein *n* is an integer of from 0 to 2.

3. A compounds having the formula

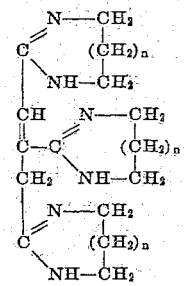

wherein *n* is an integer of from 0 to 2.

4. A compounds having the formula

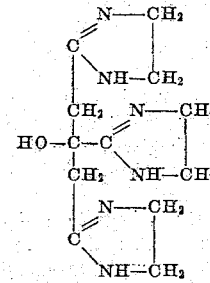

5. A compound having the formula

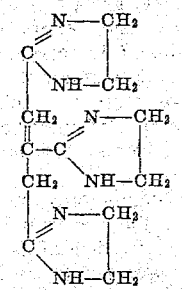

6. The process which comprises heating a mixture consisting essentially of aliphatic diamine having two primary amino groups and 2 to 4 carbon atoms in the aliphatic chain, and a tricarboxylated compound selected from the group consisting of citric acid, aconitic acid, tricarballylic acid, and the lower alkyl esters thereof, in a molar ratio of at least one mol of the diamine per mol of the tricarboxylated compound, to form a melt, raising the temperature of the mixture in the range of about 325 to about 400° F. until frothing occurs, and maintaining the temperature in the aforementioned range for a period until frothing ceases and recovering the reaction product.

7. The process which comprises heating a mixture consisting essentially of ethylene diamine and citric acid in a molar ratio of the amine to the acid of about 3:1, to form a melt, heating the reaction mixture at elevated temperature between about 350 and about 385° until frothing occurs, continuing the reaction in the aforementioned temperature range until frothing of the reaction mixture substantially ceases, removing any unreacted ethylene diamine from the reaction mixture, and recovering the reaction product.

8. The process which comprises heating a mixture essentially of ethylene diamine and aconitic acid in a molar ratio of the amine to the acid of about 3:1, to form a melt, heating the reaction mixture at elevated temperature between about 350 and about 385° until frothing occurs, continuing the reaction in the aforementioned temperature range until frothing of the reaction mixture substantially ceases, removing any unreacted ethylene diamine from the reaction mixture, and recovering the reaction product.

References Cited by the Examiner
UNITED STATES PATENTS

| | | | |
|---|---|---|---|
| 2,118,432 | 5/1938 | Gessler | 8—76 |
| 2,210,588 | 8/1940 | Kranzlein et al. | 260—309.6 |
| 2,484,146 | 10/1949 | Barber et al. | 260—309.6 |
| 2,520,102 | 8/1950 | Tryon | 260—309.6 |
| 2,865,927 | 12/1958 | Cain | 260—309.6 |
| 2,894,908 | 7/1959 | Newcombe et al. | 260—309.6 |
| 2,899,441 | 8/1959 | Dornfeld | 260—309.6 |
| 2,913,454 | 11/1959 | Petersen et al. | 260—349 |
| 2,931,812 | 4/1960 | Kalm | 260—256.4 |
| 2,940,816 | 6/1960 | Sniegowski | 8—76 |
| 2,987,514 | 6/1961 | Hughes et al. | 260—309.6 |
| 2,992,230 | 7/1961 | Lescisin | 260—309.6 |
| 3,029,236 | 4/1962 | Staeuble et al. | 260—249.5 |
| 3,078,136 | 2/1963 | Trosken et al. | 8—54.2 |
| 3,138,610 | 6/1964 | Buc et al. | 260—309.6 |

OTHER REFERENCES

Shriner et al., The Systematic Identification of Organic Compounds, 3rd Ed., pp. 3–16, New York, Wiley, 1948.

WALTER A. MODANCE, *Primary Examiner.*

IRVING MARCUS, NICHOLAS RIZZO, *Examiners.*

NATALIE TROUSOF, *Assistant Examiner.*